United States Patent
Rohde et al.

(10) Patent No.: US 6,387,314 B1
(45) Date of Patent: May 14, 2002

(54) PROCESS FOR INCREASING THE FLAME RESISTANCE OF POLYETHYLENE-CONTAINING HOLLOWWARE

(75) Inventors: Wolfgang Rohde, Speyer; Günther Pfirrmann, Ludwigshafen; Peter Bauer, Ludwigshafen; Andreas Haufe, Ludwigshafen; Joachim Koch, Bockenheim, all of (DE)

(73) Assignee: Basell Polyolefin GmbH, Kehl (DE)

( * ) Notice: Subject to any disclaimer, the term of this patent is extended or adjusted under 35 U.S.C. 154(b) by 0 days.

(21) Appl. No.: 09/456,524

(22) Filed: Dec. 8, 1999

(30) Foreign Application Priority Data

Dec. 8, 1998 (DE) .......................................... 198 56 445

(51) Int. Cl.[7] .............................................. B29C 71/02
(52) U.S. Cl. ...................................................... 264/345
(58) Field of Search ................................ 264/234, 345, 264/512, 515, 523

(56) References Cited

U.S. PATENT DOCUMENTS

| | | |
|---|---|---|
| 3,293,341 A | 12/1966 | Boeke |
| 3,544,673 A | 12/1970 | Inskeep |
| 5,020,687 A | 6/1991 | Siezert |

FOREIGN PATENT DOCUMENTS

| | | |
|---|---|---|
| DE | 39 08 418 A1 | 9/1990 |
| EP | 106099 A2 | 4/1984 |
| EP | 416 631 A1 | 2/1991 |
| EP | 645400 A1 | 3/1995 |
| EP | 993 196 A2 | 8/1999 |
| GB | 1306959 | 2/1973 |

OTHER PUBLICATIONS

Schotland et al,. J. Am. Chem. Soc., Div. Pol. Sci., 1968, 9(2), p. 1219–1226.

W. Daubenbuechel, Kunststoffe 81, 1991, 894–898.

W. Daubenbuechel, Kunststoffe 82, 1992, 201–206.

Translation of DE 19617592 (Undated).

*Primary Examiner*—Leo B. Tentoni
(74) *Attorney, Agent, or Firm*—Keil & Weinkauf

(57) ABSTRACT

A process for increasing the flame resistance of polyethylene-containing, single- or multilayer hollowware, in particular plastic fuel tanks, by heat treating the hollowware at 60–135° C.

2 Claims, No Drawings

PROCESS FOR INCREASING THE FLAME RESISTANCE OF POLYETHYLENE-CONTAINING HOLLOWWARE

OBJECT OF INVENTION

The present invention relates to a process for increasing the flame resistance of polyethylene-containing, single- or multilayer hollowware, in particular plastic fuel tanks, by heat-treating the hollowware at 60–135° C.

BACKGROUND OF THE INVENTION

Polyethylene (PE), in particular high-density polyethylene (HDPE), is highly suitable for extrusion blow molding of hollowware. A particular application of such hollowware is the storage and transport of hazardous liquid substances. A further application is in plastic fuel tanks (PFTs), which are used in automobiles for space- and weight-saving storage of liquid gasoline or diesel fuel. For safety reasons, such hollowware is subject to high requirements, in particular regarding its fracture resistance, impact strength and flame resistance. The flame resistance of such hollowware is determined by a fire test, i.e. the tank is treated with a flame under defined test conditions, and the time until leaks occur is determined.

The flame resistance of a PFT can be increased for a given shape by increasing the tank wall thickness, at least in the zones which are particularly at risk in the event of fire. However, this has the disadvantageous consequence of undesirably increasing the weight of the PFT. It may even have an adverse effect on the fracture behavior, since stresses concentrate locally to a greater extent. In addition, production costs increase with increased material consumption and the longer cooling times in the case of blow molding due to the greater wall thickness.

There has therefore been no lack of attempts to improve the flame resistance of polyethylene hollowware without increasing the wall thickness.

EP-A 645 400 discloses a specific ethylene polymer for the production of flame-resistant plastic fuel tanks. However, its production requires a two-step process consisting of prepolymerization and main polymerization and very specific catalysts. It is therefore inconvenient and expensive.

U.S. Pat. No. 5,020,687 discloses PFTs having reinforcing fabric inlays of flame-inhibiting, intumescent materials. However, these reinforcements must be introduced into the blow mold in advance.

This process too is inconvenient and expensive and can result in considerable reductions in strength in the components.

Furthermore, EP-A 106 099 and DE-A 196 17 592, for example, disclose providing PFTs with flame-inhibiting coatings. DE-19 50 662 discloses a PFT which is additionally coated with a metal foil. Coatings of this type are usually very expensive, since they require additional process steps. It is disadvantageous that the adhesion of such coatings to PE is low, and consequently they can become detached in the event of an accident, which is the very time when the full effectiveness of the coating is absolutely necessary.

It is an aim in automobile construction to reduce the vehicle weight. Although the outlined methods have already allowed PFTs with improved flame resistance to be obtained, there continues to be a demand for a further increase in the flame resistance. It is an object of the present invention to find a simple method of further improving the flame resistance of polyethylene-containing hollowware, enabling the weight of a PFT to be reduced without adversely affecting the flame resistance.

BRIEF DESCRIPTION OF THE INVENTION

It is known that the rigidity and stress cracking resistance of polyethylene bottles can be improved by heat-treatment (see, for example, U.S. Pat. No. 3,293,341, U.S. Pat. No. 3,544,673, R. S. Schotland et al., Poly. Prep., Am. Chem. Soc., Div. Pol. Sci. (1968), 9(2), 1219–1226). Surprisingly, and also entirely unexpectedly to the person skilled in the art, it has been found that the flame resistance of polyethylene-containing hollowware can be considerably improved by a special heat-treatment.

Accordingly, we have found a process for increasing the flame resistance of polyethylene-containing single- or multilayer hollowware, in particular plastic fuel tanks, by heat-treating the hollowware at 60–135° C.

DETAILED DESCRIPTION OF THE INVENTION

The novel process is carried out using known single- or multilayer hollowware having at least one polyethylene-containing layer. In particular, the hollowware is the sort which can usually be used for the storage and transport of hazardous liquid materials, in particular flammable, liquid materials, such as, for example, chemical bottles, transport containers (IBCs), drums, tanks or canisters, particularly preferably plastic fuel tanks.

The walls of the hollowware can consist of one or more layers, where at least one layer comprises at least 90%, based on the total weight of the layer, of polyethylene homo- or copolymers.

The comonomer content of the polyethylene copolymers should preferably not exceed 1 mol % of the total amount of monomers employed Preferred comonomers are 1-olefins, and particularly preferred comonomers are 1-butene, 4-methyl-1-pentene, 1-hexene and 1-octene. The polyethylene may furthermore also be a blend of two or more polyethylene components. The polyethylene homopolymers or copolymers may furthermore contain conventional additives and auxiliaries, for example stabilizers against damaging processing influences, against thermal oxidation, ageing and the effect of UV, and dyes, organic and inorganic pigments or pigment preparations, for example carbon black dispersions in polyethylene, antistatics, waxes or special low-molecular-weight lubricants. However, the amount of additives and auxiliaries should not exceed 10% by weight, preferably 5% by weight, based on the total amount of material.

The density of the polyethylene homopolymer or copolymer is 0.94–0.97 g/cm$^3$. The density is preferably 0.94–0.955 g/cm$^3$. The melt flow rate MFR 190/21.6 of the polyethylene is 0.5–20 g/10 min. The melt flow rate MRF 190/21.6 is preferably 2–10 g/10 min. The polyethylene preferably has a weight average molar mass of 200–800 kg/mol and a polydispersity $M_w/M_n$ of 5–80.

Further layers may be, for example, permeation barrier layers or adhesion promoter layers. Permeation barrier layers can be produced, for example, from ethylene-vinyl alcohol copolymers, polyamides or polybutylene terephthalate. Adhesion promoter layers can be, for example, layers essentially consisting of copolymers of ethylene and comonomers selected from the group consisting of vinyl alcohol esters, (meth)acrylic acids and esters thereof, and nitriles and amides of meth(acrylic) acid.

The hollowware may also have a number of polyethylene layers and a number of additional layers. An advantageous structure of a PFT consists, for example, of the following layer sequence: polyethylene layer-adhesive layer-permeation barrier layer-adhesive layer-regrind layer-polyethylene layer.

Multilayer hollowware of this type is known and can advantageously be produced by coextrusion (see, for example, W. Daubenbüchel, "Use of coextrusion in extrusion blow moldings", Kunststoffe 81, 894 (1991) and "Coextruded plastic fuel tanks", ibidem, 82, 201 (1992).

Also suitable for the novel process is hollowware in which the barrier polymer is not in the form of a continuous layer, but instead forms labyrinth-like structures primarily intended to lengthen the diffusion path of the permeants through the PFT wall. Examples of these PFT types which may be mentioned here are Selar® PFTS.

It is also possible to use hollowware whose surface has been finished by methods known to the person skilled in the art, for example fluorination, sulfonation, plasma polymerization or surface coating. The hollowware described at the outset can also particularly advantageously be employed with flame-inhibiting coatings or flame-inhibiting inlays.

In the novel process for increasing the flame resistance, the hollowware described is heat-treated at 60–135° C., preferably 80–120° C. During the heat-treatment, the flame resistance of the hollowware increases significantly. The hollowware is advantageously heat-treated until an extension of the treatment time no longer produces any improvement in flame resistance. The heat-treatment duration depends on the treatment conditions. In general, the heat-treatment duration is from 0.25 to 30 h, preferably 1–20 h, in particular 2–15 h.

The warming of the hollowware to the heat-treatment temperature can be effected in any desired manner; the only important factor is that the warming takes place evenly. For example, the heat-treatment can be carried out in a fan-assisted drying cabinet. The heat-treatment step can advantageously be carried out in an oven directly downstream of the blow molding process, so that the energy of the hot-demolded hollowware can also be utilized for the heat-treatment. However, it can also be carried out in a separate step. For example, the heat-treatment can be carried out in a process step with any off-line fluorination which may be necessary. In this case, the tank is heat-treated directly in the fluorination chamber. It is also possible to heat-treat a PFT—incomplete, partly complete or fully complete—on site just before it is installed in an automobile.

The flame resistance of hollowware treated in this way, which can be determined, for example, in accordance with DIN 54 837 by flame treatment in a combustion chamber, is, surprisingly, significantly increased compared to the untreated hollowware. A particular advantage of the novel process is that there is no need to use special PE polymers, but instead hollowware made from commercially available tough PE polymers.

The following experiments are intended to illustrate the invention by way of example, without thereby restricting the scope of the invention.

The measurement parameters were determined as follows:

| | |
|---|---|
| Density [g/cm$^3$] | in accordance with ISO 1183 |
| Melt flow rate | in accordance with ISO 1133 |
| MFR 190/21.6 [g/10 min] | |

COMPARATIVE EXAMPLES 1–2, EXAMPLES 4–6

For the experiments, round-bottom test bottles with a capacity of 300 ml made from Lupolen® 4261 AG ($\rho$=0.945 g/cm$^3$; MFR 190/21.6=6.0) were produced in a Krupp-Kautex V8 blow-molding unit. The wall thickness of the bottles was 0.8, 1.5 or 2.0 mm. Some of each type of bottle were heat-treated in a drying cabinet for 17 h. In each case, 10 bottles heat-treated at 110° C. for 15 h and 10 corresponding untreated bottles were each filled with 150 ml of water (20° C.) to which a small amount of soap solution had been added in order to avoid water drops of any size adhering to the inner wall of the bottle. The filled bottles were heat-treated in a combustion chamber in accordance with DIN 54 837, with the flame on the water-filled lower part of the bottle at an angle of 450°. The point of contact of the flame was 30 mm above the bottle base. The flame resistance measure used was the time before holes appeared, no distinction being made whether these were below or above the fill level. Table 1 shows the measurement values found for untreated and heat-treated bottles as a mean of 10 measurements in each case.

TABLE 1

Flame resistance of bottles made from Lupolen ® 4261 AG with and without heat-treatment

| Wall thickness | Comparative Example No. | Time before appearance of holes untreated | Example No. | Time before appearance of holes heat-treated | Increase |
|---|---|---|---|---|---|
| 0.8 mm | 1 | 42 s | 4 | 47 s | +12% |
| 1.5 mm | 2 | 91 s | 5 | 116 s | +27% |
| 2.0 mm | 3 | 249 s | 6 | 303 s | +23% |

We claim:

1. A process for increasing the flame resistance of single- or multilayer plastic fuel tanks containing at least one layer consisting of at least 90% by weight, based on the total weight of the layer, of ethylene homo- or copolymers having a density of 0.94–0.97 g/cm$^3$ and a melt flow rate MFR 190/21.6 of 0.5–20 g/10 min, which comprises subjecting the plastic fuel tanks to heat treatment at 60–135° C.

2. A process as claimed in claim 1, wherein the duration of the heat treatment is from 0.25 to 30 h.

* * * * *